United States Patent
Kim et al.

(10) Patent No.: US 10,727,908 B2
(45) Date of Patent: Jul. 28, 2020

(54) METHOD FOR TERMINAL REPORTING APERIODIC HYBRID CSI IN MULTIPLE ANTENNA COMMUNICATION SYSTEM, AND DEVICE THEREFOR

(71) Applicant: LG ELECTRONICS INC., Seoul (KR)

(72) Inventors: Hyungtae Kim, Seoul (KR); Jonghyun Park, Seoul (KR); Haewook Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/312,978

(22) PCT Filed: Jul. 11, 2017

(86) PCT No.: PCT/KR2017/007415
§ 371 (c)(1),
(2) Date: Dec. 21, 2018

(87) PCT Pub. No.: WO2018/012850
PCT Pub. Date: Jan. 18, 2018

(65) Prior Publication Data
US 2019/0312614 A1 Oct. 10, 2019

Related U.S. Application Data

(60) Provisional application No. 62/360,947, filed on Jul. 11, 2016, provisional application No. 62/376,983, (Continued)

(51) Int. Cl.
*H04B 7/0417* (2017.01)
*H04B 7/06* (2006.01)
(Continued)

(52) U.S. Cl.
CPC ............ *H04B 7/0417* (2013.01); *H04B 7/06* (2013.01); *H04B 7/0617* (2013.01);
(Continued)

(58) Field of Classification Search
CPC .. H04B 7/0408; H04B 7/0617; H04B 7/0695; H04B 7/0851; H04B 7/0417; H04W 7/06;
(Continued)

(56) References Cited

U.S. PATENT DOCUMENTS

| 10,587,316 | B2 * | 3/2020 | Kim | H04B 7/0626 |
| 2013/0336214 | A1 | 12/2013 | Sayana et al. | |
| 2015/0009928 | A1 | 1/2015 | Sohn et al. | |
| 2017/0195031 | A1 * | 7/2017 | Onggosanusi | H04L 1/0027 |

(Continued)

OTHER PUBLICATIONS

PCT International Application No. PCT/KR2017/007415, Written Opinion of the International Searching Authority dated Oct. 24, 2017, 20 pages.

(Continued)

*Primary Examiner* — Mewale A Ambaye
(74) *Attorney, Agent, or Firm* — Lee, Hong, Degerman, Kang & Waimey

(57) ABSTRACT

Disclosed is a method for a terminal reporting aperiodic channel status information (CSI) to a base station in a wireless communication system. The method comprises the steps of: receiving, from a base station via downlink control information (DCI), a CSI report triggering message of at least one CSI process, among multiple CSI processes, that is connected with one enhanced multiple input multiple output (eMIMO) type among a first eMIMO type and a second eMIMO type; and updating an aperiodic CSI associated with the at least one CSI process and reporting same to the base station based on a reference signal corresponding to the one eMIMO type.

8 Claims, 10 Drawing Sheets

Related U.S. Application Data filed on Aug. 19, 2016, provisional application No. 62/420,534, filed on Nov. 10, 2016.

(51) Int. Cl.
*H04W 72/04* (2009.01)
*H04W 72/14* (2009.01)

(52) U.S. Cl.
CPC ......... *H04B 7/0626* (2013.01); *H04B 7/0632* (2013.01); *H04B 7/0639* (2013.01); *H04W 72/042* (2013.01); *H04W 72/14* (2013.01)

(58) Field of Classification Search
CPC ............. H04W 12/28; H04W 28/0205; H04W 72/042; H04W 72/14; H04W 24/10
See application file for complete search history.

(56) References Cited

U.S. PATENT DOCUMENTS

| | | | |
|---|---|---|---|
| 2017/0279509 A1* | 9/2017 | Rahman | H04B 7/0417 |
| 2018/0098346 A1* | 4/2018 | Liu | H04B 7/0626 |
| 2019/0097693 A1* | 3/2019 | Park | H04L 5/0053 |

OTHER PUBLICATIONS

CATT, "CSI reporting for hybrid CSI-RS", 3GPP TSG RAN WG1 Meeting #85, R1-164222, May 2016, 3 pages.
Ericsson, "Hybrid CSI Reporting with One and Two CSI Processes", 3GPP TSG RAN WG1 Meeting #85, R1-165098, May 2016, 6 pages.
NTT Docomo, "CSI Reporting for Hybrid CSI-RS", 3GPP TSG RAN WG1 Meeting #85, R1-165202, May 2016, 4 pages.

\* cited by examiner

FIG. 2
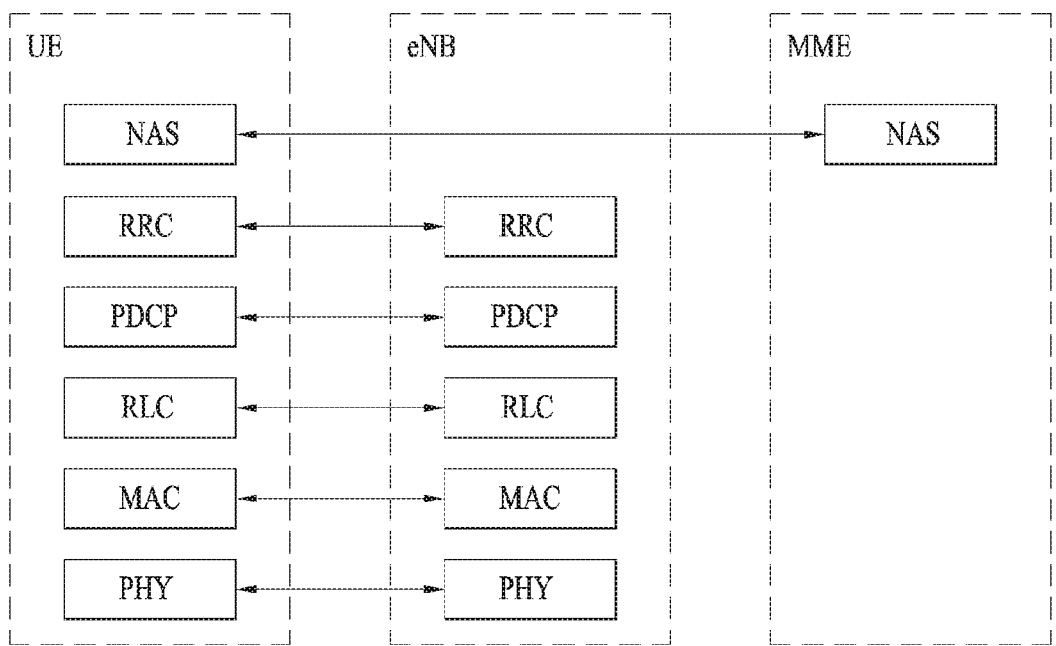
(a) Control-plane protocol stack
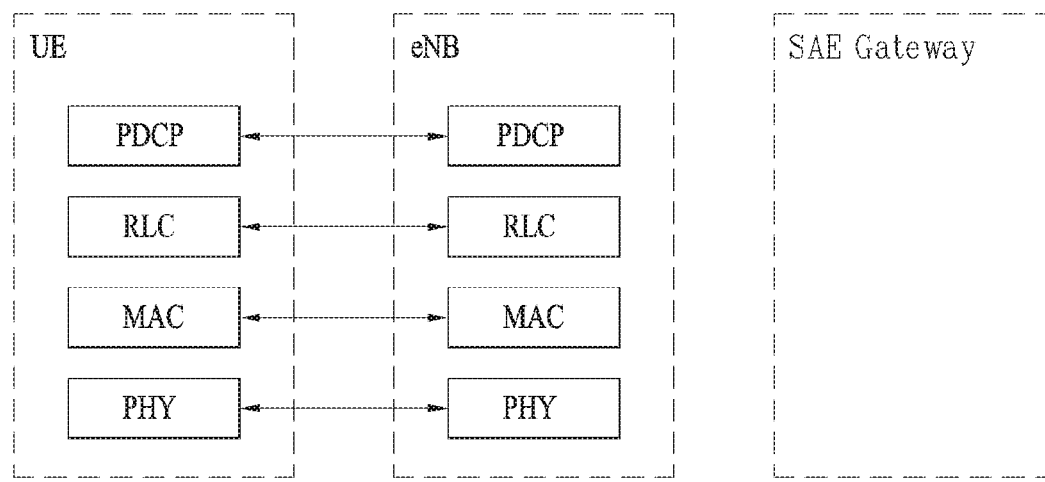
(b) User-plane protocol stack :
METHOD FOR TERMINAL REPORTING APERIODIC HYBRID CSI IN MULTIPLE ANTENNA COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2017/007415, filed on Jul. 11, 2017, which claims the benefit of U.S. Provisional Application No. 62/360,947, filed on Jul. 11, 2016, 62/376,983, filed on Aug. 19, 2016, and 62/420,534, filed on Nov. 10, 2016, the contents of which are all hereby incorporated by reference herein in their entirety.

TECHNICAL FIELD

The present invention relates to a wireless communication system, and more particularly, to a method and apparatus for reporting aperiodic hybrid channel status information (CSI) in a multi-antenna communication system.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE

Technical Problem

A method and apparatus for reporting aperiodic hybrid channel status information (CSI) in a multi-antenna communication system are proposed below based on the above discussion.

It will be appreciated by persons skilled in the art that that the effects that can be achieved through the present disclosure are not limited to what has been particularly described hereinabove and other advantages of the present disclosure will be more clearly understood from the following detailed description.

Technical Solution

In an embodiment of the present invention, a method of reporting aperiodic channel status information (CSI) to a base station by a terminal in a wireless communication system includes receiving, from the base station, a CSI report triggering message for at least one of a plurality of CSI processes by downlink control information (DCI), the at least one CSI process being associated with one of a first enhanced multiple input multiple output (eMIMO) type and a second eMIMO type, updating aperiodic CSI for the at least one CSI process based on a reference signal corresponding to the one eMIMO type, and reporting the updated aperiodic CSI to the base station.

Meanwhile, in an embodiment of the present invention, a terminal in a wireless communication system includes a wireless communication module, and a processor connected to the wireless communication module. The processor is configured to receive, from the base station, a CSI report triggering message for at least one of a plurality of CSI processes by DCI, the at least one CSI process being associated with one of a first eMIMO type and a second eMIMO type, and to update aperiodic CSI for the at least one CSI process based on a reference signal corresponding to the one eMIMO type, and report the updated aperiodic CSI to the base station.

Preferably, a reference signal corresponding to the second eMIMO type is beamformed based on CSI reported based on a reference signal corresponding to the first eMIMO type.

In the above embodiments, the terminal may receive, from the base station through a higher layer, information about the plurality of CSI processes for which a hybrid CSI reporting scheme is defined. The hybrid CSI reporting scheme may include reporting CSI of the first eMIMO type and reporting CSI of the second eMIMO type. Preferably, the DCI may include an uplink grant.

More preferably, the terminal may report, to the base station, terminal capability information including first information about a maximum number of reference signal resources per CSI process, supported by the terminal, and second information about the sum of numbers of antenna ports in the reference signal resources per CSI process, supported by the terminal. In this case, first information about the at least one CSI process may be the sum of a maximum number of reference signal resources corresponding to the first eMIMO type and a maximum number of reference signal resources corresponding to the second eMIMO type. Further, second information about the at least one CSI process may be the sum of the number of antenna ports corresponding to the first eMIMO type and the number of antenna ports corresponding to the second eMIMO type.

Advantageous Effects

According to the embodiments of the present invention, feedback of aperiodic hybrid channel status information (CSI) can be carried out more effectively in a multi-antenna communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 2 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN);

BEST MODE FOR CARRYING OUT THE INVENTION

Figure 1:
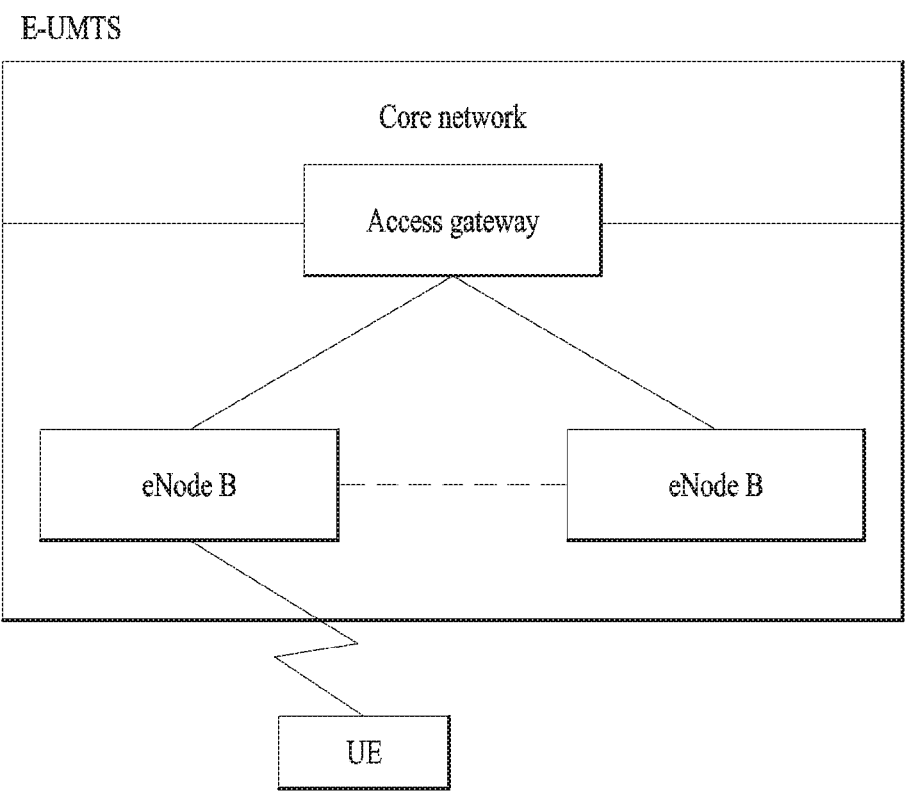
FIG. 1 illustrates a configuration of an Evolved Universal Mobile Telecommunications System (E-UMTS) network as an example of a wireless communication system.

The configuration, operation, and other features of the present invention will readily be understood with embodiments of the present invention described with reference to the attached drawings. Embodiments of the present invention as set forth herein are examples in which the technical features of the present invention are applied to a 3rd Generation Partnership Project (3GPP) system.

While embodiments of the present invention are described in the context of Long Term Evolution (LTE) and LTE-Advanced (LTE-A) systems, they are purely exemplary. Therefore, the embodiments of the present invention are applicable to any other communication system as long as the above definitions are valid for the communication system. In addition, while the embodiments of the present invention are described in the context of Frequency Division Duplexing (FDD), they are also readily applicable to Half-FDD (H-FDD) or Time Division Duplexing (TDD) with some modifications.

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer.

A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

One cell managed by an eNB is set to one of the bandwidths of 1.25, 2.5, 5, 10, 15, and 20 MHz, and provides a DL or UL transmission service to a plurality of UEs in the bandwidth. Different cells may be configured to provide different bandwidths.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
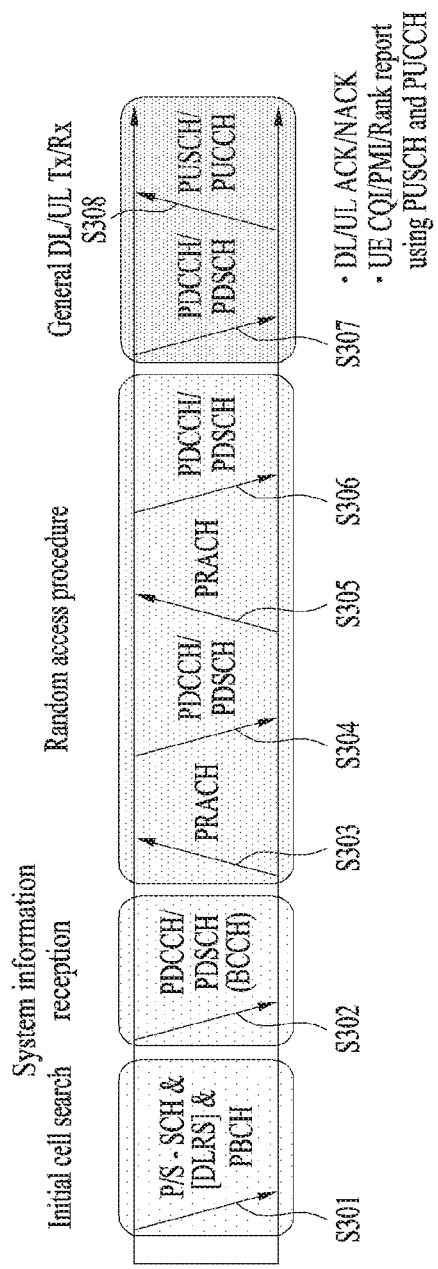
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
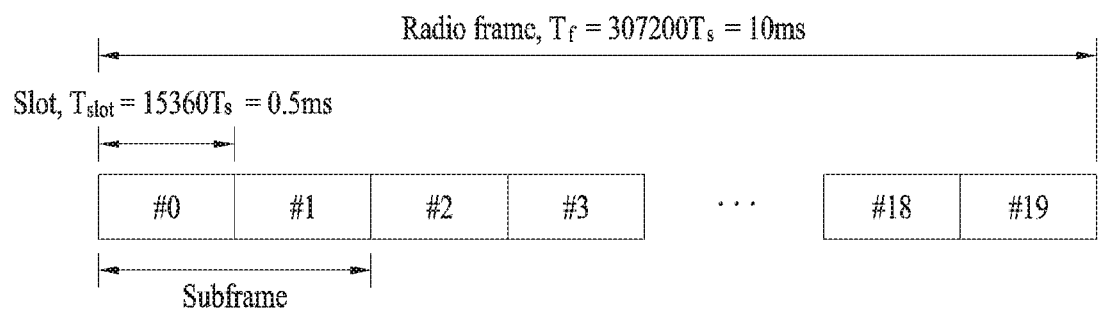
FIG. 4 illustrates a structure of a radio frame in a Long Term Evolution (LTE) system.

FIG. 4 illustrates a structure of a radio frame used in the LTE system.

Referring to FIG. 4, a radio frame is 10 ms ($327200 \times T_s$) long and divided into 10 equal-sized subframes. Each subframe is 1 ms long and further divided into two slots. Each time slot is 0.5 ms ($15360 \times T_s$) long. Herein, $T_s$ represents a sampling time and $T_s=1/(15 \text{ kHz} \times 2048)=3.2552 \times 10^{-8}$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
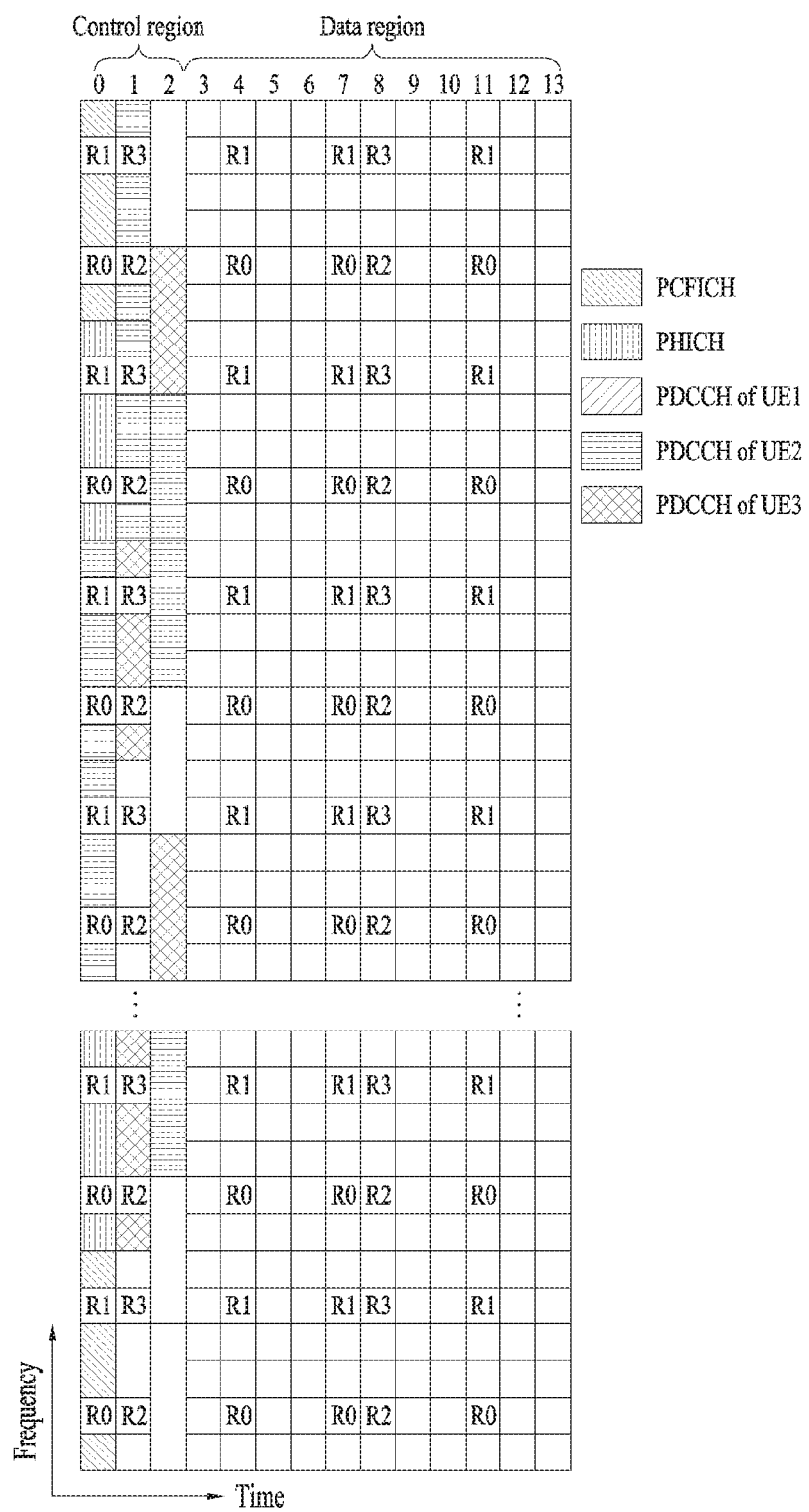
FIG. 5 illustrates a structure of a downlink radio frame in the LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
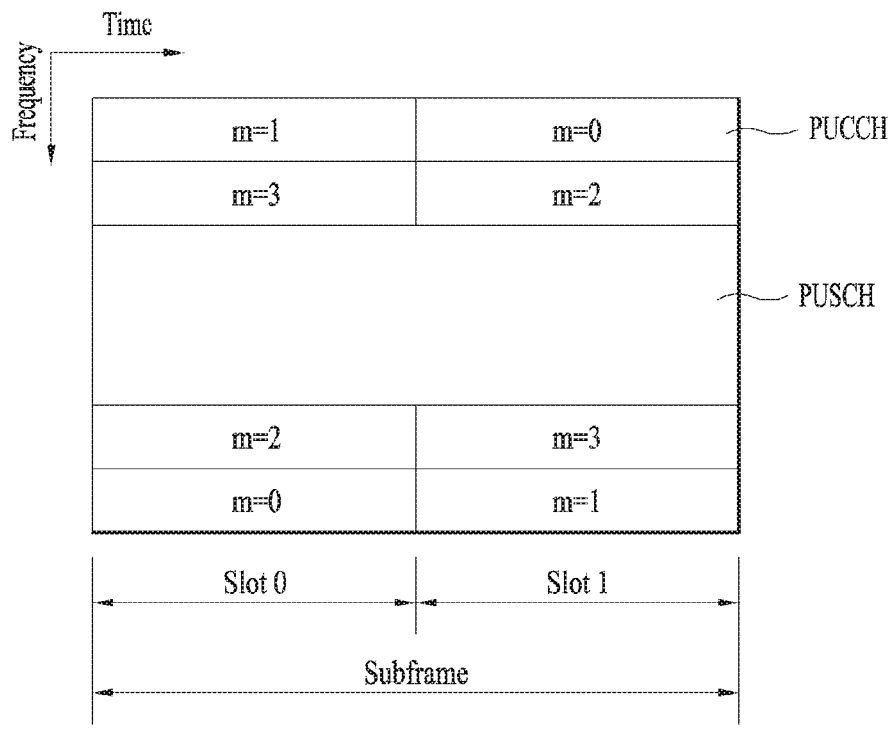
FIG. 6 illustrates a structure of an uplink subframe in the LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Hereinafter, a MIMO system will be described. MIMO refers to a method of using multiple transmission antennas and multiple reception antennas to improve data transmission/reception efficiency. Namely, a plurality of antennas is used at a transmitting end or a receiving end of a wireless communication system so that capacity can be increased and performance can be improved. MIMO may also be referred to as 'multi-antenna' in this disclosure.

MIMO technology does not depend on a single antenna path in order to receive a whole message. Instead, MIMO technology collects data fragments received via several antennas, merges the data fragments, and forms complete data. The use of MIMO technology can increase system coverage while improving data transfer rate within a cell area of a specific size or guaranteeing a specific data transfer rate. MIMO technology can be widely used in mobile communication terminals and relay nodes. MIMO technology can overcome the limitations of the restricted amount of transmission data of single antenna based mobile communication systems.

Figure 7:
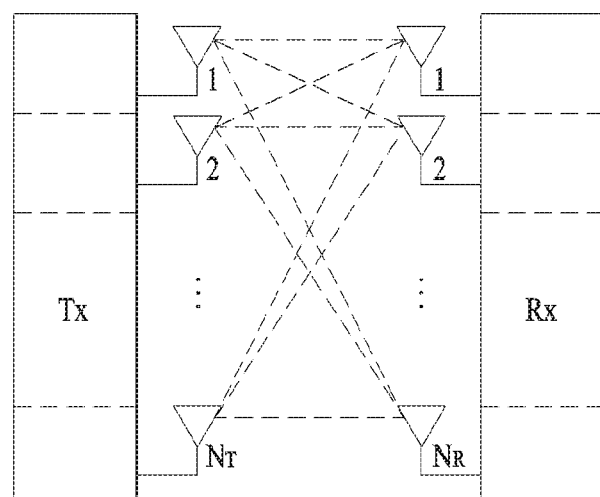
FIG. 7 is an exemplary view illustrating the configuration of a general multiple input multiple output (MIMO) communication system.

The configuration of a general MIMO communication system is shown in FIG. 7.

A transmitting end is equipped with $N_T$ transmission (Tx) antennas and a receiving end is equipped with $N_R$ reception (Rx) antennas. If a plurality of antennas is used both at the transmitting end and at the receiving end, theoretical channel transmission capacity increases unlike the case where only either the transmitting end or the receiving end uses a plurality of antennas. Increase in channel transmission capacity is proportional to the number of antennas, thereby improving transfer rate and frequency efficiency. If a maximum transfer rate using a signal antenna is $R_o$, a transfer rate using multiple antennas can be theoretically increased by the product of the maximum transfer rate $R_o$ by a rate increment $R_i$. The rate increment $R_i$ is represented by the following equation 1 where $R_i$ is the smaller of $N_T$ and $N_R$.

$$R_i = \min(N_T, N_R) \qquad \text{[Equation 1]}$$

For example, in a MIMO communication system using four Tx antennas and four Rx antennas, it is possible to theoretically acquire a transfer rate four times that of a single antenna system. After theoretical increase in the capacity of the MIMO system was first demonstrated in the mid-1990s, various techniques for substantially improving data transfer rate have been under development. Several of these techniques have already been incorporated into a variety of wireless communication standards including, for example, 3rd generation mobile communication and next-generation wireless local area networks.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transfer rate.

To describe a communication method in a MIMO system in detail, a mathematical model thereof is given below. As shown in FIG. 7, it is assumed that $N_T$ Tx antennas and $N_R$ Rx antennas are present. In the case of a transmission signal, a maximum number of transmittable pieces of information is $N_T$ under the condition that $N_T$ Tx antennas are used, so that transmission information can be represented by a vector represented by the following equation 2:

$$s = [s_1, s_2, \ldots, s_{N_T}]^T \qquad \text{[Equation 2]}$$

Meanwhile, individual transmission information pieces $s_1, s_2, \ldots, s_{N_T}$ may have different transmission powers. In this case, if the individual transmission powers are denoted by $P_1, P_2, \ldots, P_{N_T}$, transmission information having adjusted transmission powers can be represented by a vector shown in the following equation 3:

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

The transmission power-controlled transmission information vector ŝ may be expressed as follows, using a diagonal matrix P of a transmission power:

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots, x_{N_T}$ to be actually transmitted may be configured by multiplying the transmission power-controlled information vector ŝ by a weight matrix W. In this case, the weight matrix is adapted to properly distribute transmission information to individual antennas according to transmission channel situations. The transmission signals $x_1, x_2, \ldots, x_{N_T}$ can be represented by the following Equation 5 using a vector X. In Equation 5, $W_{ij}$ is a weight between the i-th Tx antenna and the j-th information and W is a weight matrix, which may also be referred to as a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

Generally, the physical meaning of a rank of a channel matrix may be a maximum number of different pieces of information that can be transmitted in a given channel. Accordingly, since the rank of the channel matrix is defined as the smaller of the number of rows or columns, which are independent of each other, the rank of the matrix is not greater than the number of rows or columns A rank of a channel matrix H, rank(H), is restricted as follows.

$$\text{rank}(H) \leq \min(N_T, N_R) \quad \text{[Equation 6]}$$

Each unit of different information transmitted using MIMO technology is defined as a 'transmission stream' or simply 'stream'. The 'stream' may be referred to as a 'layer'. The number of transmission streams is not greater than a rank of a channel which is a maximum number of different pieces of transmittable information. Accordingly, the channel matrix H may be indicted by the following Equation 7:

$$\text{\# of streams} \leq \text{rank}(H) \leq \min(N_T, N_R) \quad \text{[Equation 7]}$$

where '# of streams' denotes the number of streams. It should be noted that one stream may be transmitted through one or more antennas.

There may be various methods of allowing one or more streams to correspond to multiple antennas. These methods may be described as follows according to types of MIMO technology. The case where one stream is transmitted via multiple antennas may be called spatial diversity, and the case where multiple streams are transmitted via multiple antennas may be called spatial multiplexing. It is also possible to configure a hybrid of spatial diversity and spatial multiplexing.

Now, a description of a Channel status information (CSI) report is given. In the current LTE standard, a MIMO transmission scheme is categorized into open-loop MIMO operated without CSI and closed-loop MIMO operated based on CSI. Especially, according to the closed-loop MIMO system, each of the eNB and the UE may be able to perform beamforming based on CSI to obtain a multiplexing gain of MIMO antennas. To obtain CSI from the UE, the eNB allocates a PUCCH or a PUSCH to command the UE to feedback CSI for a downlink signal.

CSI is divided into three types of information: a Rank Indicator (RI), a Precoding Matrix Index (PMI), and a Channel Quality Indicator (CQI). First, RI is information on a channel rank as described above and indicates the number of streams that can be received via the same time-frequency resource. Since RI is determined by long-term fading of a channel, it may be generally fed back at a cycle longer than that of PMI or CQI.

Second, PMI is a value reflecting a spatial characteristic of a channel and indicates a precoding matrix index of the eNB preferred by the UE based on a metric of Signal-to-Interference plus Noise Ratio (SINR). Lastly, CQI is information indicating the strength of a channel and indicates a reception SINR obtainable when the eNB uses PMI.

An advanced system such as an LTE-A system considers additional multi-user diversity through multi-user MIMO (MU-MIMO). Due to interference between UEs multiplexed in an antenna domain in MU-MIMO, the accuracy of CSI may significantly affect interference with other multiplexed UEs as well as a UE that reports the CSI. Accordingly, more accurate CSI than in single-user MIMO (SU-MIMO) should be reported in MU-MIMO.

In this context, the LTE-A standard has determined to separately design a final PMI as a long-term and/or wideband PMI, W1, and a short-term and/or subband PMI, W2.

For example, a long-term covariance matrix of channels expressed as Equation 8 may be used for hierarchical codebook transformation that configures one final PMI with W1 and W2.

$$W = \text{norm}(W1\,W2) \quad \text{[Equation 8]}$$

In Equation 8, W2 is a short-term PMI, which is a codeword of a codebook reflecting short-term channel information, W is a codeword of a final codebook, and norm(A) is a matrix obtained by normalizing each column of matrix A to 1.

Conventionally, the codewords W1 and W2 are given as Equation 9.

$$W1(i) = \begin{bmatrix} X_i & 0 \\ 0 & X_i \end{bmatrix}, \quad \text{[Equation 9]}$$

where $X_i$ is Nt/2 by M matrix.

$$W2(j) = \overbrace{\begin{bmatrix} e_M^k & e_M^l & \cdots & e_M^m \\ \alpha_j e_M^k & \beta_j e_M^l & & \gamma_j e_M^m \end{bmatrix}}^{r\ columns}$$

(if rank=r), where $1 \leq k,l,m \leq M$ and k,l,m are integer.

Herein, $N_T$ represents the number of transmission antennas, and M represents the number of columns in a matrix Xi, indicating that the matrix Xi has a total of M candidate column vectors. $e_M^k$, $e_M^l$ and $e_M^m$ represent $k^{th}$, $l^{th}$, and $m^{th}$ column vectors of Xi, in which $k^{th}$, $l^{th}$, and $m^{th}$ elements are 0 and the remaining elements are 1, respectively. $\alpha_j$, $\beta_j$, and $\gamma_j$ are complex values each having a unit norm, indicating that when $k^{th}$, $l^{th}$, and $m^{th}$ column vectors of the matrix Xi are selected, phase rotation is applied to these column vectors, respectively. i is an integer equal to or larger than 0, representing a PMI indicating W1, and j is an integer equal to or larger than 0, representing a PMI indicating W2.

In Equation 9, the codewords are designed so as to reflect correlation characteristics between established channels, if cross-polarized antennas are densely arranged, for example, the distance between adjacent antennas is equal to or less than half a signal wavelength. The cross-polarized antennas may be divided into a horizontal antenna group and a vertical antenna group and the two antenna groups are co-located, each having the property of a uniform linear array (ULA) antenna.

Therefore, the correlations between antennas in each group have the same linear phase increment property and the correlation between the antenna groups is characterized by phase rotation. Since a codebook is quantized values of channels, it is necessary to design a codebook reflecting channel characteristics. For convenience of description, a rank-1 codeword designed in the above manner may be given as Equation 10.

$$W1(i) * W2(j) = \begin{bmatrix} X_i(k) \\ \alpha_j X_i(k) \end{bmatrix} \quad \text{[Equation 10]}$$

In Equation 10, a codeword is expressed as an $N_T \times 1$ vector where NT is the number of Tx antennas and the codeword is composed of an upper vector $X_i(k)$ and a lower vector $\alpha_j X_i(k)$, representing the correlation characteristics of the horizontal and vertical antenna groups, respectively. $X_i(k)$ is expressed as a vector having the linear phase increment property, reflecting the correlation characteristics between antennas in each antenna group. For example, a discrete Fourier transform (DFT) matrix may be used for $X_i(k)$.

As described before, CSI includes, but not limited to, a CQI, a PMI, and an RI, and all or a part of the CQI, the PMI, and the RI are transmitted according to the transmission mode of each UE in the LTE system. Periodic CSI transmission is referred to as periodic CSI reporting, and CSI transmission upon request of an eNB is referred to as aperiodic CSI reporting.

In aperiodic CSI reporting, an eNB transmits a request bit included in UL scheduling information to a UE. The UE then transmits CSI based on its transmission mode to the eNB on a PUSCH.

In periodic CSI reporting, a period, an offset in the period, and so on are signaled semi-statically to each UE on a subframe basis by higher-layer signaling. The UE transmits CSI based on a transmission mode at a predetermined period on a PUCCH to the eNB. If UL data also exists in a subframe carrying the CSI, the CSI is transmitted together with the UL data on a PUSCH.

The eNB transmits, to each UE, transmission timing information suitable for the UE in consideration of the channel state of the UE and the distribution of UEs in a cell. The transmission timing information may include a period, an offset, and so on required for CSI transmission, and may be transmitted to the UE by an RRC message.

A description will be given below of coordinated multipoint (CoMP) transmission/reception.

The introduction of a technique of increasing system performance by enabling cooperation between a plurality of cells is intended for a beyond LTE-A system. The technique is called CoMP. In CoMP, two or more eNBs, access points (APs), or cells cooperate with each other for communication with a specific UE, in order to enable more reliable communication between the specific UE and the eNBs, APs, or cells. In the present invention, the terms eNB, AP, and cell are interchangeably used in the same meaning.

Generally in a multi-cellular environment with a frequency reuse factor of 1, the performance of a UE at a cell edge and an average sector throughput may be reduced in view of inter-cell interference (ICI). To reduce ICI, the legacy LTE system allows a UE located at a cell edge to have an appropriate throughput performance in an interference-constrained environment by adopting a simple passive technique such as factional frequency reuse (FER) based on UE-specific power control. However, it may be more preferable to reduce ICI or reuse ICI as a desired signal for a UE than to reduce per-cell frequency resource use. To this end, a CoMP transmission scheme may be used.

Figure 8:
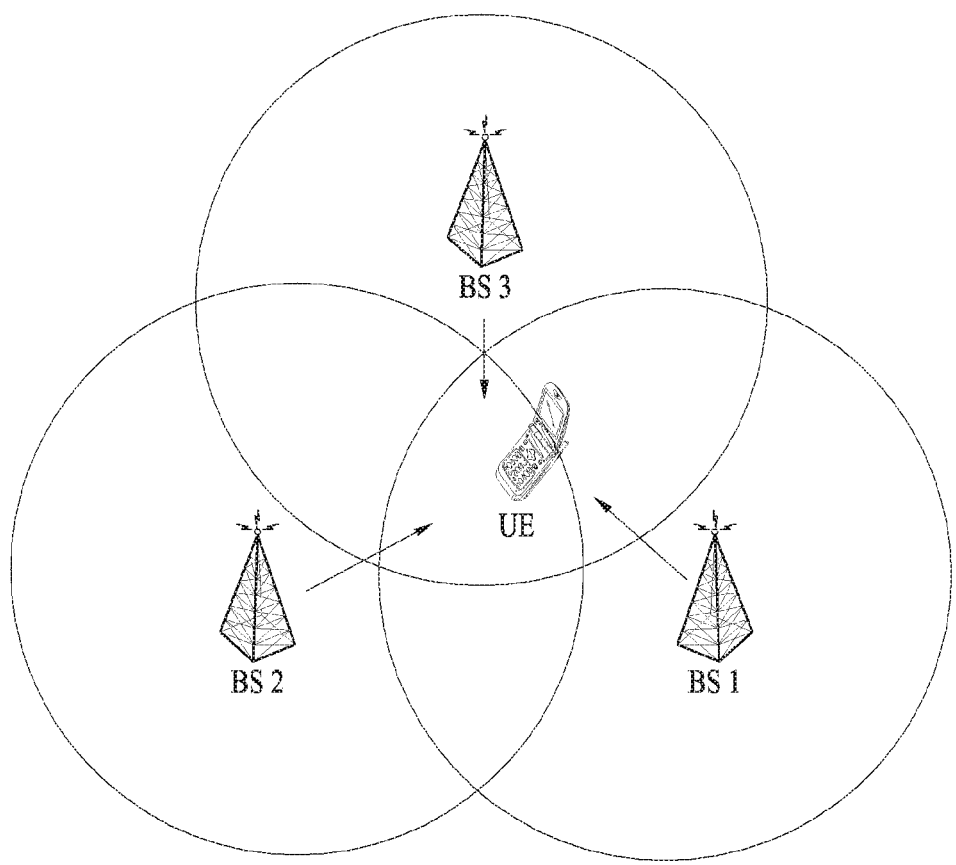
FIG. 8 is an exemplary view illustrating coordinated multi-point (CoMP) implementation.

FIG. 8 illustrates an example of carrying out CoPM. Referring to FIG. 8, a wireless communication system includes a plurality of BSs that perform CoMP, BS1, BS2 and BS3, and a UE. The plurality of BSs that perform CoMP, BS1, BS2 and BS3 may efficiently transmit data to the UE by cooperating with each other.

CoMP transmission schemes may be classified into CoMP-joint processing (CoMP-JP) called cooperative MIMO characterized by data sharing, and CoMP-coordinated scheduling/beamforming (CoMP-CS/CB).

In DL CoMP-JP, a UE may receive data simultaneously from BSs that perform CoMP transmission, and combine the received signals, thereby increasing reception performance (joint transmission (JT)). In addition, one of the BSs participating in the CoMP transmission may transmit data to the UE at a specific time point (dynamic point selection (DPS)). In CoMP-CS/CB, a UE may receive data instantaneously from one BS, that is, a serving BS by beamforming.

In UL CoMP-JP, a plurality of BSs may receive a PUSCH signal from a UE at the same time (joint reception (JR)). In contrast, in UL CoMP-CS/CB, only one BS may receive a PUSCH from a UE. Herein, cooperative cells (or BSs) may make a decision as to whether to use CoMP-CS/CB.

A UE adopting a CoMP transmission scheme, that is, a CoMP UE may feed back channel information (referred to as a CSI feedback) to a plurality of BSs that perform the CoMP transmission scheme. A network scheduler may select an appropriate CoMP transmission scheme that increases a transmission rate from among CoMP-JP, CoMP-CS/CB, and DPS based on the CSI feedback. For this purpose, the CoMP UE may follow a PUCCH-based periodic feedback transmission scheme by configuring CSI feedbacks for the plurality of BSs performing the CoMP transmission scheme. In this case, feedback configurations for the respective BSs may be independent of each other. Accordingly, each operation of feeding back channel information with such an independent feedback configuration will be referred to as a CSI process in the disclosure according to an embodiment of the present invention. One or more CSI processes may exist in one serving cell.

Figure 9:
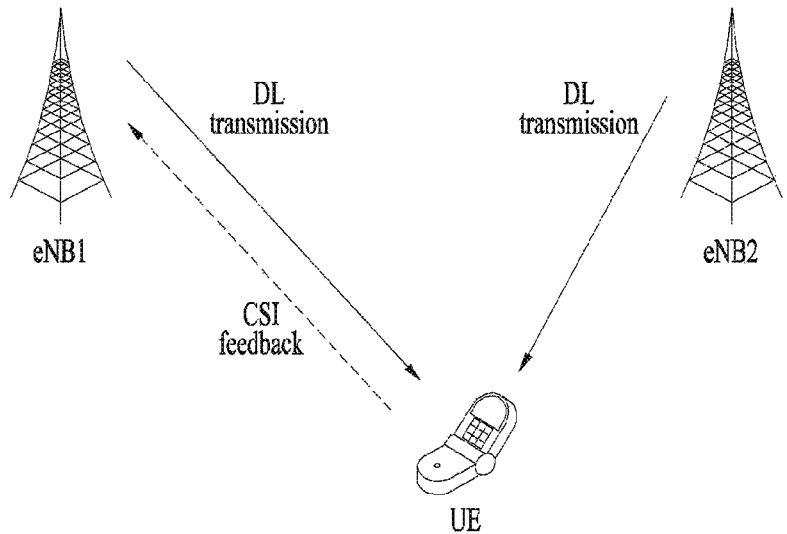
FIG. 9 is a view illustrating a downlink CoMP operation.

FIG. 9 illustrates a DL CoMP operation.

In FIG. 9, a UE is located between two eNBs, eNB1 and eNB2. The two eNBs (i.e., eNB1 and eNB2) perform an appropriate CoMP operation such as JT, DCS, or CS/CB in order to cancel interference to the UE. The UE transmits an appropriate CSI feedback to assist the eNBs in the CoMP operation. Information transmitted by the CSI feedback may include PMI information and CQI information for each eNB, and may further include channel information between the two eNBs (e.g., phase offset information between channels of the two eNBs), for JT.

In FIG. 9, although the UE transmits a CSI feedback signal to its serving cell, eNB1, the UE may transmit a CSI feedback signal to eNB2 or both of the eNBs, when needed. Further, while a basic unit participating in CoMP is shown in FIG. 9 as an eNB, the present invention is also applicable to CoMP between transmission points (TPs) controlled by a single eNB.

That is, to enable the network to perform CoMP scheduling, the UE should feedback DL CSI for a neighbor eNB/TP participating in CoMP as well as DL CSI for the serving eNB/TP. For this purpose, the UE transmits feedbacks for a plurality of CSI processes which reflect various data transmitting eNBs/TPs and various interference environments.

Therefore, an interference measurement resource (IMR) is used to measure interference for use in calculating CoMP CSI in the LTE system. A plurality of IMRs may be configured for one UE, and the UE has an independent configuration for each of the IMRs. That is, a period, an offset, and a resource configuration are independently configured for each IMR, and the eNB may signal the independent configuration for each IMR to the UE by higher-layer signaling (RRC signaling or the like).

In addition, the LTE system uses a CSI-RS to measure a desired channel, which is required for calculating CoMP CSI. A plurality of CSI-RSs may be configured for one UE, and each of the CSI-RSs may have an independent configuration. That is, a period, an offset, a resource configuration, power control (PC), and the number of antenna ports may be configured independently for each CSI-RS, and the eNB signals information related to the CSI-RS to the UE by higher-layer signaling (RRC signaling or the like).

One CSI process may be configured for a UE by associating one CSI-RS for signal measurement with one IMR for interference measurement from among a plurality of CSI-RSs and a plurality of IMRs configured for the UE. The UE feeds back CSI derived from different CSI processes with independent periods and subframe offsets to the network (e.g., an eNB).

That is, each CSI process has an independent CSI feedback configuration. The eNB may indicate a per-CSI process CSI-RS resource, IMR, and CSI feedback configuration to the UE by higher-layer signaling such as RRC signaling or the like. For example, it is assumed that three CSI processes as listed in Table 1 are configured for the UE.

TABLE 1

| CSI Process | Signal Measurement Resource (SMR) | IMR |
|---|---|---|
| CSI Process 0 | CSI-RS 0 | IMR 0 |
| CSI Process 1 | CSI-RS 1 | IMR 1 |
| CSI Process 2 | CSI-RS 0 | IMR 2 |

In [Table 1], CSI-RS 0 and CSI-RS 1 are respectively a CSI-RS received from the serving eNB of the UE, eNB1, and a CSI-RS received from a neighbor eNB participating in CoMP, eNB2. It is assumed that IMRs are configured for the CSI processes listed Table 1, as illustrated in Table 2.

TABLE 2

| IMR | eNB 1 | eNB 2 |
|---|---|---|
| IMR 0 | Muting | Data transmission |
| IMR 1 | Data transmission | Muting |
| IMR 2 | Muting | Muting |

It is configured that in IMR 0, eNB1 is mute, eNB2 transmits data, and the UE measures interference from the other eNBs except for eNB1. Similarly, it is configured that in IMR 1, eNB2 is mute, eNB1 transmits data, and the UE measures interference from the other eNBs except for eNB2. Further, it is configured that in IMR 2, both of eNB1 and eNB2 are mute, and the UE measures interference from the other eNBs except for eNB1 and eNB2.

Therefore, as noted from Table 1 and Table 2, CSI of CSI process 0 represents best RI, PMI, and CQI information, in the case where the UE receives data from eNB1. CSI of CSI process 1 represents best RI, PMI, and CQI information, in the case where the UE receives data from eNB2. CSI of CSI process 2 represents best RI, PMI, and CQI information, in the case where the UE receives data from eNB1 without any interference from eNB2.

The introduction of an active antenna system (AAS) is a recent active research area for future-generation mobile communication. As each antenna is configured as an active antenna having an active circuit in the AAS, the AAS is a technology that may be applied more efficiently for interference reduction or beamforming by changing an antenna pattern adaptively according to a situation.

When the AAS is implemented two-dimensionally, that is, a two-dimensional AAS (2D-AAS) is realized, it is possible to change a transmission beam more actively according to the location of a receiver by more efficiently controlling the main lobe of an antenna three-dimensionally in an antenna pattern.

Figure 10:
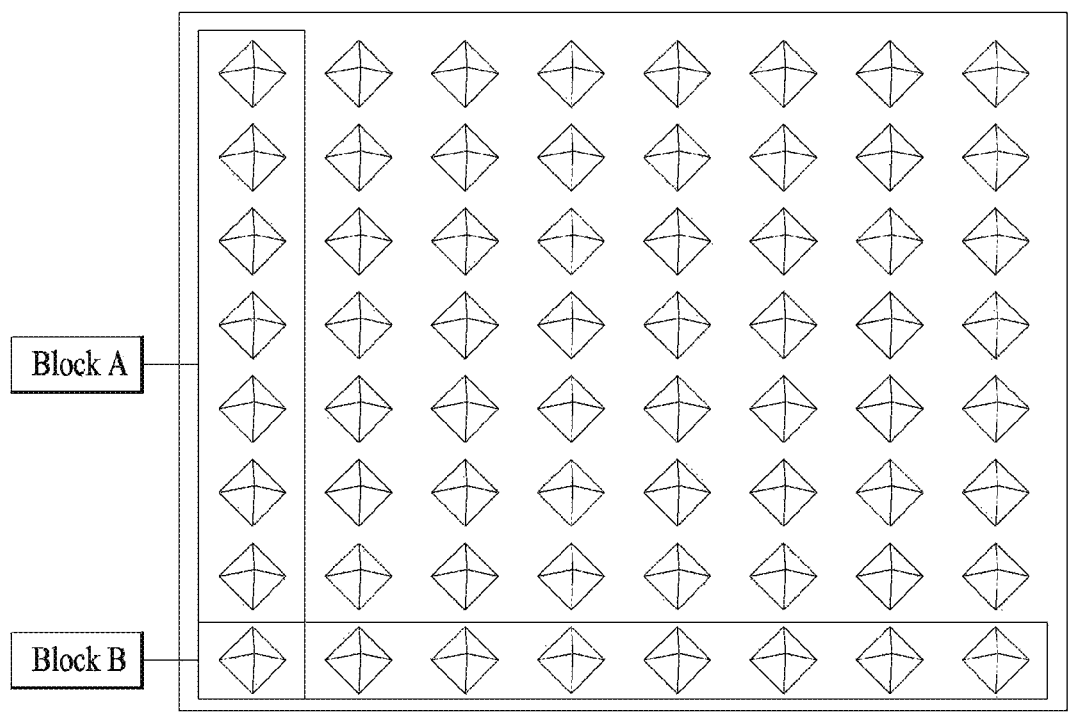
FIG. 10 is a view illustrating an implementation example of a two-dimensional active antenna system (2D-ASS)

FIG. 10 illustrates an implementation example of the 2D-AAS. Particularly, FIG. 10 is based on the assumption of a co-polarized antenna array in which each antenna element has the same polarization. Referring to FIG. 10, as antennas are arranged vertically and horizontally in the 2D-AAS, it is expected that the 2D-AAS will be deployed as a large-scale antenna system.

In a full dimension-MIMO (FD-MIMO) system to which the 2D-AAS is applied, an eNB may configure a plurality of CSI-RS resources in one CSI process for a UE. A CSI process refers to an operation of feeding back channel information with an independent feedback configuration.

In this case, the UE assumes the CSI-RS resources configured in the single CSI process to be one huge CSI-RS resource by aggregating the CSI-RS resources, calculates CSI from the aggregate, and feeds back the calculated CSI. For example, the eNB configures three 4-port CSI-RS resources in one CSI process for the UE, and the UE assumes one 12-port CSI-RS resource by aggregating the three 4-port CSI-RS resources. The UE calculates CSI by using a 12-port PMI from the CSI-RS resource, and feeds back the CSI. This reporting mode is referred to as class A CSI reporting in the LTE-A system.

Or, the UE selects one of the CSI-RS resources, assuming that each of the CSI-RS resources is an independent channel, and calculates and reports CSI based on the selected resource. That is, the UE selects a CSI-RS having a strong channel from among the eight CSI-RSs, calculates CSI based on the selected CSI-RS, and reports the CSI to the eNB. The UE additionally reports the selected CSI-RS to the eNB by a CSI-RS resource indicator (CRI). For example, if the channel of a first CSI-RS corresponding to T(0) is strongest, the UE reports a CRI set to 0 (CRI=0) to the eNB. This reporting mode is referred to as class B CSI reporting in the LTE-A system.

To represent the above features more effectively, the following parameters may be defined for a CSI process in class B. K represents the number of CSI-RS resources in one CSI process, and $N_k$ represents the number of CSI-RS ports in a $k^{th}$ CSI-RS resource.

<Hybrid CSI>

Meanwhile, hybrid CSI has recently been introduced for the 3GPP standardization, in order to further improve the FD-MIMO system. With reference to the drawings, hybrid CSI will be described in detail.

Figure 11:
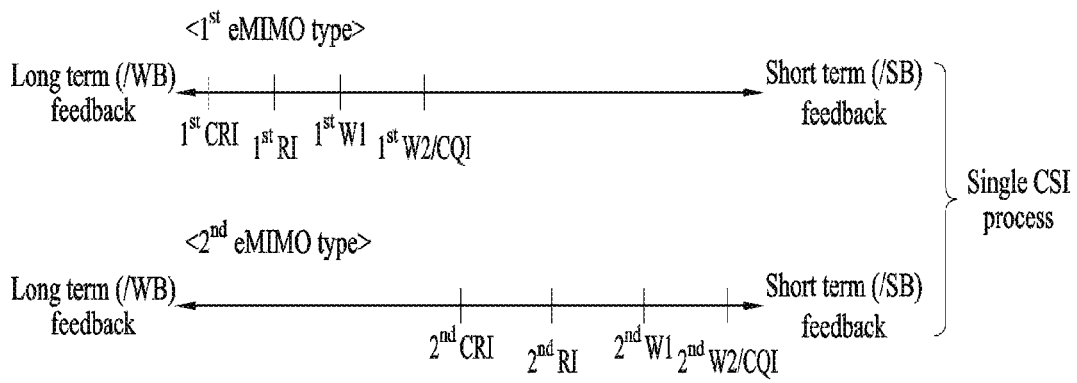
FIG. 11 is an exemplary view illustrating the concept of hybrid channel status information (CSI)

FIG. 11 is an exemplary view illustrating the concept of hybrid CSI.

Referring to FIG. 11, two enhanced MIMO (eMIMO) types are defined in a single CSI process. CSI is produced for each eMIMO type. CSI of the first eMIMO type is fed back over a longer term, or carries wideband (WB) CSI, compared to CSI of the second eMIMO type. That is, the eNB configures a single CSI process with the first eMIMO type and the second eMIMO type for the UE (i.e., the eNB transmits CSI process information to the UE by higher-layer signaling), and changes beamforming applied to a CSI-RS of the second eMIMO type, using CSI of the first eMIMO type received from the UE. The UE then reports CSI based on the CSI-RS of the second eMIMO type to the eNB.

In FIG. 11, CSI of the first eMIMO type and CSI of the second eMIMO type are defined respectively as first CSI (i.e., a first CRI, a first RI, first W1, first W2, and a first CQI) and second CSI (i.e., a second CRI, a second RI, second W1, second W2, and a second CQI).

Table 3 below illustrates exemplary operation mechanisms for hybrid CSI, reflected in the 3GPP standardization. Specifically, in hybrid CSI reporting mechanism 1, whether to transmit an RI is for further study (FFS), and W1 is reported in the first CSI. K, which represents the number of CSI-RSs defined in one class B CSI process, is 1. In the second CSI, therefore, a CRI is not reported, an RI, W2, and a CQI are reported, and whether to report W1 depends on a class B PMI configuration of the second eMIMO type, indicated by RRC signaling (i.e., if the PMI configuration is 0, W1 is reported, and if the PMI configuration is 1, W1 is not reported).

With the first eMIMO type and the second eMIMO type defined in one CSI process, if the eNB triggers a PUSCH CSI feedback for the CSI process by DCI format 0, DCI format 4, or the like, the UE may feed back CSI for both of the first eMIMO type and the second eMIMO type defined in the CSI process, which unfortunately brings a very great feedback overhead. Accordingly, it is proposed to feed back CSI in one of the following methods.

(1) Only for CSI indicated by the eNB between first CSI and second CSI, PUSCH CSI may be fed back.

More specifically, the eNB may select one of the first CSI and the second CSI for hybrid CSI reporting, and indicate the UE to feed back the selected CSI. The eNB may indicate one of the first CSI and the second CSI semi-statically by RRC signaling, or dynamically by allocating additional payload to DCI having a triggering field. Or the UE may select CSI having a greater variation between the first CSI and the second CSI, and report the CSI along with a PUSCH feedback indicating which CSI has been selected.

For example, a 3-bit CSI Request field added for enhanced carrier aggregation (eCA) in DCI may be used, in which one most significant bit (MSB) or one least significant bit (LSB) indicates selected CSI, and the remaining two bits function in the same manner as a legacy 2-bit CSI Request field.

In another example, CSI process-eMIMO type pairs may be pre-configured by RRC signaling, and a CSI process-eMIMO type pair to be triggered may be indicated by a field in DCI, which triggers aperiodic CSI reporting.

For example, aperiodic CSI report triggering bit fields described in Table 4 and Table 5 may be modified to Table 6 and Table 7.

TABLE 4

| Value of CSI request field | Description |
| --- | --- |
| '00' | No aperiodic CSI report is triggered |
| '01' | Aperiodic CSI report is triggered for a set of CSI process(es) configured by higher layers for serving cell $^c$ |

TABLE 3

| Type | First CRI | First RI | First W1 | First W2/CQI | Second CRI | Second RI | Second W1 | Second W2 | Second CQI |
| --- | --- | --- | --- | --- | --- | --- | --- | --- | --- |
| Mechanism 1 | A + B w/ K = 1 | N.A. (Class A) | FFS | ○ | X | X (K = 1) | ○ | Depending on PMI config | ○ | ○ |
| Mechanism 2 | B + B w/ K = 1 | ○ (K > 1) | X | X | X | X (K = 1) | ○ | ○ | ○ | ○ |

Now, a description will be given of the present invention with reference to Table 3 and FIG. 11. It is to be noted that Table 3 and FIG. 11 are merely exemplary for the convenience of description, and the spirit of the present invention is also applicable to any modification to the hybrid CSI reporting mechanisms.

<Method of Triggering Aperiodic Hybrid CSI>

In the case where hybrid CSI is reported aperiodically, that is, hybrid CSI is reported on a PUSCH in response to a triggering message, triggering methods and encoding methods are proposed below. Further, a description will be given of methods of mapping aperiodic hybrid CSI to REs and methods of piggybacking aperiodic hybrid CSI.

TABLE 4-continued

| Value of CSI request field | Description |
| --- | --- |
| '10' | Aperiodic CSI report is triggered for a 1st set of CSI process(es) configured by higher layers |
| '11' | Aperiodic CSI report is triggered for a 2nd set of CSI process(es) configured by higher layers |

TABLE 5

| Value of CSI request field | Description |
|---|---|
| '00' | No aperiodic CSI report is triggered |
| '01' | Aperiodic CSI report is triggered for a set of CSI process(es) and/or {CSI process, CSI subframe set}-pair(s) configured by higher layers for serving cell $c$ |
| '10' | Aperiodic CSI report is triggered for a $1^{st}$ set of CSI process(es) and/or {CSI process, CSI subframe set}-pair(s) configured by higher layers |
| '11' | Aperiodic CSI report is triggered for a $2^{nd}$ set of CSI process(es) and/or {CSI process, CSI subframe set}-pair(s) configured by higher layers |

TABLE 6

| Value of CSI request field | Description |
|---|---|
| '000' | No aperiodic CSI report is triggered |
| '001' | Aperiodic CSI report is triggered for a set of CSI process(es) and/or {CSI process, eMIMO-Type}-pair(s) configured by higher layers for serving cell $c$ |
| '010' | Aperiodic CSI report is triggered for a 1st set of CSI process(es) and/or {CSI process, eMIMO-Type}-pair(s) configured configured by higher layers |
| '011' | Aperiodic CSI report is triggered for a 2nd set of CSI process(es) and/or {CSI process, eMIMO-Type}-pair(s) configured configured by higher layers |
| '100' | Aperiodic CSI report is triggered for a 3rd set of CSI process(es) and/or {CSI process, eMIMO-Type}-pair(s) configured configured by higher layers |
| '101' | Aperiodic CSI report is triggered for a 4th set of CSI process(es) and/or {CSI process, eMIMO-Type}-pair(s) configured configured by higher layers |
| '110' | Aperiodic CSI report is triggered for a 5th set of CSI process(es) and/or {CSI process, eMIMO-Type}-pair(s) configured configured by higher layers |
| '111' | Aperiodic CSI report is triggered for a 6th set of CSI process(es) and/or {CSI process, eMIMO-Type}-pair(s) configured configured by higher layers |

TABLE 7

| Value of CSI request field | Description |
|---|---|
| '000' | No aperiodic CSI report is triggered |
| '001' | Aperiodic CSI report is triggered for a set of CSI process(es) and/or {CSI process, eMIMO-Type}-pair(s) and/or {CSI process, eMIMO-Type, CSI subframe set}-pair(s) and/or {CSI process, CSI subframe set}-pair(s) configured by higher layers for serving cell $c$ |
| '010' | Aperiodic CSI report is triggered for a 1st set of CSI process(es) and/or {CSI process, eMIMO-Type}-pair(s) and/or {CSI process, eMIMO-Type, CSI subframe set}-pair(s) and/or {CSI process, CSI subframe set}-pair(s) configured by higher layers |
| '011' | Aperiodic CSI report is triggered for a 2nd set of CSI process(es) and/or {CSI process, eMIMO-Type}-pair(s) and/or {CSI process, eMIMO-Type, CSI subframe set}-pair(s) and/or {CSI process, CSI subframe set}-pair(s) configured by higher layers |
| '100' | Aperiodic CSI report is triggered for a 3nd set of CSI process(es) and/or {CSI process, eMIMO-Type}-pair(s) and/or {CSI process, eMIMO-Type, CSI subframe set}-pair(s) and/or {CSI process, CSI subframe set}-pair(s) configured by higher layers |
| '101' | Aperiodic CSI report is triggered for a 4th set of CSI process(es) and/or {CSI process, eMIMO-Type}-pair(s) and/or {CSI process, eMIMO-Type, CSI subframe set}-pair(s) and/or {CSI process, CSI subframe set}-pair(s) configured by higher layers |
| '110' | Aperiodic CSI report is triggered for a 5th set of CSI process(es) and/or {CSI process, eMIMO-Type}-pair(s) and/or {CSI process, eMIMO-Type, CSI subframe set}-pair(s) and/or {CSI process, CSI subframe set}-pair(s) configured by higher layers |
| '111' | Aperiodic CSI report is triggered for a 6th set of CSI process(es) and/or {CSI process, eMIMO-Type}-pair(s) and/or {CSI process, eMIMO-Type, CSI subframe set}-pair(s) and/or {CSI process, CSI subframe set}-pair(s) configured by higher layers |

Obviously, in the case where CSI process-eMIMO type pairs are pre-configured by RRC signaling, if the eNB triggers aperiodic CSI reporting for a specific CSI process as illustrated in Table 4 and Table 5, the UE may perform aperiodic CSI reporting for an eMIMO type which has been associated with the specific CSI process by RRC signaling.

Now, a method of encoding a first CSI feedback will be described.

A) When a PUSCH CSI feedback, that is, an aperiodic CSI feedback is triggered for first CSI, the first CSI is fed back on a PUSCH in legacy RI/CRI encoding and RE mapping schemes (irrespective of whether the first CSI is a first CRI, a first RI, or a first PMI/CQI). For example, if first W1 is reported in CSI reporting mechanism 1, the first W1 is fed back on the PUSCH in legacy RI encoding and RE mapping schemes (i.e., the first W1 is mapped to REs of OFDM symbol n+2 and OFDM symbol n−2 with respect to OFDM symbol n carrying a UL DMRS). Even when the first CSI is reported together with a CRI/RI of a different CSI process (or a second CRI/RI of the same process), the first CSI is bit-concatenated to the CRI/RI of the different CSI process (or the second CRI/RI of the same process), and then jointly encoded in the same manner as is done conventionally. To apply robust coding to the first CSI, the first CSI is located in the MSB, with priority over the legacy CSI and the second CSI. (Or on the contrary, the first CSI may be located in the LSB, with priority over the legacy CSI and the second CSI). When the first CSI includes a plurality of contents (e.g., the first CRI, the first RI, and the first PMI/CQI), the first CSI occupies the MSB in the concatenation order of CRI, RI, PMI, and CQI.

B) In another method, when a PUSCH CSI feedback is triggered for the first CSI, the first CSI is fed back on the PUSCH in the legacy CSI encoding and RE mapping schemes. For example, when the first CRI, the first RI, the first PMI, or the first CQI is reported in CSI reporting mechanism 2, the first CRI, the first RI, the first PMI, or the first CQI is fed back on the PUSCH in legacy CRI, RI, PMI, or CQI encoding and RE mapping schemes. To apply robust coding to the first CSI, the first CSI is located in the MSB, with priority over the legacy CSI and the second CSI. (Or on the contrary, the first CSI may be located in the LSB, with priority over the legacy CSI and the second CSI). When the first CSI includes a plurality of contents (e.g., the first CRI, the first RI, and the first PMI/CQI), the first CSI occupies the MSB in the concatenation order of CRI, RI, PMI, and CQI.

C) In another method, when a PUSCH CSI feedback is triggered for the first CSI, the first CSI is fed back on the PUSCH in a legacy ACK/NACK RE mapping scheme (i.e., the first CSI is mapped to REs of OFDM symbol n+2 and OFDM symbol n−2 with respect to OFDM symbol n carrying a UL DMRS). The first CSI is encoded in a legacy CRI/RI encoding scheme. For this operation, when a PUSCH feedback is trigged for the first CSI, the eNB may signal transmission of the first CSI in the positions of ACK/NACK transmission REs to the UE. Further, in order to overcome the resulting problem in an ACK/NACK operation, when the first CSI is transmitted in the positions of the ACK/NACK transmission REs, the eNB defers or advances a DL transmission such that an ACK/NACK transmission may not take place at the timing.

D) In another method, when a PUSCH CSI feedback is triggered for the first CSI, the first CSI is fed back in the legacy CSI encoding and RE mapping schemes. However, some first CSI is exceptionally subjected to encoding and RE mapping in the legacy CRI/RI encoding and RE mapping schemes (or the legacy PMI/CSI encoding and RE mapping schemes) and then fed back. For example, the first W1 (or first W2) as well as the first CRI and the first RI is encoded and mapped to REs in the same manner as the legacy CRI/RI. This is because the first W1 is first eMIMO-type information describing the directions of total channels, which is important in determining a beam for a beamformed CSI-RS of the second eMIMO type, and thus it is necessary to ensure high reliability for the first W1.

For second CSI reporting, the legacy CSI encoding and RE mapping schemes may still be used.

Meanwhile, in a multi-CSI process/multi-carrier (or multi-cellular) situation, CSI bits are concatenated in the order of CSI process indexes (i.e., a CSI process with a lower index is first allocated to the MSB), and then in the order of carrier indexes (or cell indexes). More specifically, the CSI bits are concatenated in the ascending order of CSI process indexes and then in the ascending order of carrier indexes (or cell indexes). When first CSI and second CSI calculated for the same CSI process are concatenated, the eNB concatenates the first CSI with priority (i.e., the eNB first allocates the first CSI to the MSB). The following description is given with the appreciation that carrier index # or cell index # is referred to as CC #, for the convenience of description.

For example, on the assumption that CSI process 0 and CSI process 1 are defined in CC0, CSI process 0 and CSI process 1 are defined in CC1, and hybrid CSI reporting is configured only for CSI process 1 in CC1, the following bit concatenation order may be determined.

TABLE 8

| (MSB) |
| CSI for CC0 & CSI process 0 |
| CSI for CC0 & CSI process 1 |
| CSI for CC1 & CSI process 0 |
| $1^{st}$ CSI for CC1 & CSI process 1 |
| $2^{nd}$ CSI for CC1 & CSI process 1 |
| (LSB) |

In the above example illustrated in Table 8, concatenation priorities are assigned in the order of carrier index→CSI process index→first CSI→second CSI.

Or the first CSI may be concatenated with priority over the CSI process indexes or the carrier indexes. Such concatenation is described in Table 9 and Table 10 below, by way of example.

TABLE 9

| (MSB) |
| CSI for CC0 & CSI process 0 |
| CSI for CC0 & CSI process 1 |
| $1^{st}$ CSI for CC1 & CSI process 1 |
| CSI for CC1 & CSI process 0 |
| $2^{nd}$ CSI for CC1 & CSI process 1 |
| (LSB) |

TABLE 10

| (MSB) |
| $1^{st}$ CSI for CC1 & CSI process 1 |
| CSI for CC0 & CSI process 0 |
| CSI for CC0 & CSI process 1 |
| CSI for CC1 & CSI process 0 |
| $2^{nd}$ CSI for CC1 & CSI process 1 |
| (LSB) |

Table 9 illustrates concatenation priorities assigned in the order of carrier index→first CSI→CSI process index. In addition, Table 10 illustrates concatenation priorities assigned in the order of first CSI→carrier index→CSI process index.

Additionally, it may be regulated that the second CSI is always concatenated shortly after the first CSI. In this case, a CSI process for which hybrid CSI reporting is configured is concatenated with priority over the CSI process indexes or the carrier indexes, and the first CSI occupies the MSB with priority over the second CSI in the CSI process.

If a UE, for which a PUCCH CSI feedback subframe overlaps with a PUSCH transmission subframe, performs a PUSCH transmission without performing a PUCCH transmission (i.e., the UE transmits a PUSCH because the PUSCH and a PUCCH cannot be transmitted simultaneously), the UE transmits CSI by piggybacking the CSI to the PUSCH. In this case, if the CSI to be piggybacked is first CSI, the CSI may be piggybacked in the proposed encoding and RE mapping schemes or bit concatenation schemes for a PUSCH CSI feedback.

(2) Only for the first CSI between the first CSI and the second CSI, a PUSCH CSI feedback is available.

Only for the first eMIMO type defined in a corresponding CSI process, CSI is fed back. The eNB receives corresponding information from the UE by aperiodically triggering a first CSI feedback, only when needed, and receives CSI for the second eMIMO type by a periodic PUCCH CSI feedback. Herein, if the first CSI feedback is received only on the PUSCH, a periodic PUCCH is not configured for the first CSI feedback. Further, a PUSCH is not configured for the second CSI feedback. Obviously, the first CSI is subjected to encoding, RE mapping, bit concatenation, and piggybacking in the foregoing schemes.

(3) Only for the second CSI between the first CSI and the second CSI, a PUSCH CSI feedback is available.

For the second eMIMO type defined in a corresponding CSI process, CSI is fed back. Although the eNB receives both of the first CSI and the second CSI by periodic PUCCH CSI feedbacks, an aperiodic PUSCH CSI feedback is available only for the second CSI. The second CSI is subjected to encoding, RE mapping, bit concatenation, and piggybacking in the encoding and RE mapping schemes, bit concatenation scheme, and piggybacking scheme for the legacy CSI.

<Relaxation of Aperiodic Hybrid CSI>

According to the current LTE specification, with a plurality of CSI processes configured for one serving cell for a UE, if aperiodic CSI reporting is triggered, relaxation may be adopted to reduce a CSI computation volume. Specifically, the UE has the capability of calculating CSI for up to Nx CSI processes. Let the number of CSI processes for which CSI has not been reported yet be denoted by Nu. Then, CSI is calculated only for max(Nx−Nu,0) CSI processes among CSI processes for which aperiodic CSI reporting is triggered, while CSI is not calculated for the remaining CSI processes.

Meanwhile, in the case where the first eMIMO type and the second eMIMO type are configured in one CSI process, if the eNB triggers PUSCH CSI reporting, that is, aperiodic CSI reporting for the CSI process, and thus the UE feeds back PUSCH CSI for both of first CSI and second CSI, about twice as large a computation volume as that of a legacy CSI process is required. Therefore, there is a need for modifying legacy CSI relaxation.

First of all, the legacy CSI relaxation is applied by counting a CSI process for which hybrid CSI is configured as two CSI processes, not as one CSI process. For example, when Nu is counted, if unreported CSI processes include a CSI process for which hybrid CSI is configured, the CSI process for which hybrid CSI is configured is counted as two CSI processes, not as one CSI process.

Or, when CSI is not updated for the remaining CSI processes except for max(Nx−Nu,0) CSI processes counted from a CSI process having the lowest index, a CSI process for which hybrid CSI is configured is counted as two CSI processes, not as one CSI process. For example, in the case where max(Nx−Nu,0)=3 and aperiodic CSI reporting is triggered for CSI process 0 to CSI process 2, if hybrid CSI is configured only for CSI process 0, CSI is not updated for CSI process 2. In another example, in the case where max(Nx−Nu,0)=3 and aperiodic CSI reporting is triggered for CSI process 0 to CSI process 2, if hybrid CSI is configured only for CSI process 2, CSI process 2 is counted as two CSI processes. Thus, CSI is updated for CSI process 0 and CSI process 1, whereas CSI is not updated for CSI process 2.

However, due to the capability of updating CSI for one additional CSI process, it is inefficient not to update the CSI for CSI process 2. Therefore, the efficiency may be increased by regulating that only first CSI is updated for CSI process 2 without updating second CSI for CSI process 2. That is, a part of first CSI and second CSI for a CSI process for which hybrid CSI is configured may be updated, and the first CSI is first updated.

Or a UE in a TDD system may define a different maximum number Nx of CSI processes for which CSI can be calculated according to the number of configured CSI processes in the legacy relaxation scheme. Even in this case, Nx is determined by counting a CSI process for which hybrid CSI is configured as two CSI processes, not as one CSI process, when the configured CSI processes are counted.

Meanwhile, if multiple CSI processes are configured and CSI reporting is triggered in subframe # n, a CSI reference resource configuration may be changed, that is, relaxed from before subframe #(n−4) to before subframe #(n−5), as described in Table 11.

TABLE 11 for a UE configured in transmission mode 10 with multiple configured CSI processes for the serving cell, the CSI reference resource for a given CSI process is defined by a single downlink or special subframe n-n$_{CQI\_ref}$,
where for FDD serving cell and periodic or aperiodic CSI reporting n$_{CQI\_ref}$ is the smallest value greater than or equal to 5, such that it corresponds to a valid downlink or valid special subframe, and for aperiodic CSI reporting the corresponding CSI request is in an uplink DCI format;
where for FDD serving cell and aperiodic CSI reporting n$_{CQI\_ref}$ is equal to 5 and subframe n-n$_{CQI\_ref}$ corresponds to a valid downlink or valid special subframe, where subframe n-n$_{CQI\_ref}$ is received after the subframe with the corresponding CSI request in a Random Access Response Grant.
where for TDD serving cell, and 2 or 3 configured CSI processes, and periodic or aperiodic CSI reporting, n$_{CQI\_ref}$ is the smallest value greater than or equal to 4, such that it corresponds to a valid downlink or valid special subframe, and for aperiodic CSI reporting the corresponding CSI request is in an uplink DCI format;
where for TDD serving cell, and 2 or 3 configured CSI processes, and aperiodic CSI reporting, n$_{CQI\_ref}$ is equal to 4 and subframe n-n$_{CQI\_ref}$ corresponds to a valid downlink or valid special subframe, where subframe n-n$_{CQI\_ref}$ is received after the subframe with the corresponding CSI request in a Random Access Response Grant;
where for TDD serving cell, and 4 configured CSI processes, and periodic or aperiodic CSI reporting, n$_{CQI\_ref}$ is the smallest value greater than or equal to 5, such that it corresponds to a valid downlink or valid special subframe, and for aperiodic TABLE 11-continued CSI reporting the corresponding CSI request is in an uplink DCI format;
where for TDD serving cell, and 4 configured CSI processes, and aperiodic CSI
reporting, $n_{CQI\_ref}$ is equal to 5 and subframe $n-n_{CQI\_ref}$ corresponds to a valid
downlink or valid special subframe, where subframe $n-n_{CQI\_ref}$ is received after the
subframe with the corresponding CSI request in a Random Access Response Grant.

It is proposed that even when aperiodic CSI reporting is performed for hybrid CSI, a reference resource timing is relaxed to before subframe #(n−5) according to the legacy scheme, and in counting the number of configured CSI processes, which is the condition of relaxation to subframe #(n−5), a CSI process for which hybrid CSI is defined is counted as two CSI processes, not as one CSI process. For example, in the case where three CSI processes are configured for a UE, with hybrid CSI for one of the CSI processes, the number of CSI processes is counted as 4. This relaxation method may be applied in the same manner to a periodic PUCCH CSI feedback.

<Restriction on RB Allocation for Aperiodic PUSCH CSI Feedback>

According to the current standard specification, when an eNB triggers an aperiodic PUSCH CSI feedback by DCI, the number of allocated RBs per CSI process is limited to 4 or less. The restriction is imposed in order to ensure scheduling flexibility for data scheduling of the eNB by setting a maximum limit on resources used for a feedback because no data transmission resource is allocated in an RB carrying a PUSCH CSI feedback (in the case of a piggybacked CSI feedback, CSI is transmitted along with data, whereas in the case of an aperiodic CSI feedback triggered by the eNB, CSI is not transmitted along with data). Further, in light of simulated verification that a sufficiently low block error rate (BLER) is achieved by transmitting CSI in 4 or fewer RBs, the maximum number of allocated RBs per CSI process is determined to be 4.

As described before, when two eMIMO types are defined in a CSI process, and a PUSCH CSI feedback is triggered for the CSI process, a UE may report both of first CSI and second CSI for the CSI process. Compared to a legacy CSI process, the amount of the CSI to be fed back may increase by about twice. As a result, allocation of up to 4 RBs as is done conventionally may lead to an increase in BLER. (That is, a decoding error probability may be increased). Accordingly, even though one CSI process for which hybrid CSI is configured (hereinafter, referred to as hybrid CSI process) is triggered, the number $N_{PRB}$ of allocated RBs should be increased. For example, if one or more hybrid CSI processes are triggered, it is necessary to limit $N_{PRB}$ to 20 or less, as is the case with triggering two or more legacy CSI processes. Or if one hybrid CSI process is triggered, it is necessary to limit $N_{PRB}$ to 8 or less. Or with the legacy restriction on $N_{PRB}$ still used, if a hybrid CSI process is triggered, the UE counts the hybrid CSI process as two CSI processes, not as one CSI process, and then applies the legacy scheme.

Hybrid CSI differs in the computation volume and payload size of first CSI according to CSI reporting mechanisms. For example, while CSI reporting mechanism 1 in which only W1 is calculated has a smaller computation volume than CSI reporting mechanism 2 in which a CRI, an RI, a PMI, and a CQI are calculated, the computation volumes of first CSI and second CSI may be similar in CSI reporting mechanism 2. Payload sizes are also analogous to the computation volumes. Therefore, the above-described CSI computation volume relaxation method and RB allocation restriction method for a UE may or may not be applied according to CSI reporting mechanisms.

Further, there is no limit on the maximum number of allocated RBs in eCA because up to 32 component carriers or cells may be aggregated in eCA. Likewise, it is preferable not to impose a limit on RB allocation in hybrid CSI. This is because in hybrid CSI, the first CSI is considered to be more important than the legacy CSI, which makes it preferable to reduce a coding rate and thus maintain a high protection rate for the first CSI, and restriction on RB allocation results in a constraint on reduction of a coding rate. For example, if first CSI is triggered by a CSI Request field, or if the first CSI is triggered along with other CSI, RB allocation may be not be restricted. Or in this case, the RB allocation restriction may be relieved, an example of which is that when only first CSI is triggered or the first CSI is triggered together with second CSI defined in the same CSI process, RB allocation is limited to 8 RBs or 20 RBs despite triggering of one CSI process, instead of the legacy restriction to 4 RBs.

<UE Capability Reporting for Hybrid CSI>

Regarding hybrid CSI, the UE should report to the eNB whether the UE is capable of calculating CSI. The UE also reports a maximum number of its supported CSI-RS ports (for one CSI process). The maximum number of CSI-RS ports is determined to be the sum of the number of first eMIMO-type CSI-RS ports, and the number of second eMIMO-type CSI-RS ports. For example, if the maximum number of CSI-RS ports is 40, the number of first eMIMO-type CSI-RS ports may be set to 32, and the number of second eMIMO-type CSI-RS ports may be set to 8 or less.

Or the UE reports a maximum number of first eMIMO-type CSI-RS ports and a maximum number of second eMIMO-type CSI-RS ports respectively to the eNB. For example, if the UE reports to the eNB the maximum number of first eMIMO-type CSI-RS ports as 32 and the maximum number of second eMIMO-type CSI-RS ports as 4, the eNB limits the number of second eMIMO-type CSI-RS ports to 4 or less, that is, maintains the number of second eMIMO-type CSI-RS ports to be 4 at maximum, even though the eNB sets the number of first eMIMO-type CSI-RS ports to 16.

The UE should report, as its capability, a maximum K value, Kmax supported for a class B CSI process (i.e., K is the number of CSI-RS resources defined in the class B CSI process) and a maximum N value, Nmax supported for the class B CSI process (i.e., N is the sum of ports for CSI-RS resources defined in the class B CSI process). In this case, the UE may select one of two different Nmax values for every K value ranging from 2 to Kmax, and report the selected Nmax value. As K is larger, a selectable Nmax value is larger. This is because the processing power of the UE increases with a larger Kmax value, the UE may support a larger Nmax value.

In hybrid CSI reporting, a class B CSI process is configured with the first eMIMO type or/and the second eMIMO type. Accordingly, a method of reporting a UE capability should newly be defined. The following may be considered as methods of reporting a UE capability, which support hybrid CSI reporting.

Method 1.

Method 1 is an extension of a legacy scheme, in which a UE reports Kmax and Nmax values for the first eMIMO type and Kmax and Nmax values for the second eMIMO type, respectively. The legacy scheme of reporting Kmax and Nmax values for one eMIMO type is extended to the hybrid CSI reporting method in which Kmax and Nmax values for each eMIMO type are reported.

Method 2.

A shortcoming with Method 1 is that the implementation freedom of a UE is restricted. For example, it may be considered that the UE is implemented so as to support a hybrid CSI reporting scheme in which two CSI-RSs are defined for the first eMIMO type, and one CSI-RS is defined for the second eMIMO type, and a hybrid CSI reporting scheme in which one CSI-RS is defined for the first eMIMO type, and two CSI-RSs are defined for the second eMIMO type. In this case, the UE should report a first Kmax value of 2, and a second Kmax value of 2 according to Method 1. However, if the UE is implemented so as to support the above two hybrid CSI reporting schemes without supporting a hybrid CSI reporting scheme in which two CSI-RSs are defined for the first eMIMO type, and two CSI-RSs are defined for the second eMIMO type, there is a problem with reporting.

In this context, it is proposed in Method 2 that the UE reports its capability for a (first Kmax, second Kmax) pair, and reports a plurality of such pairs per UE per band per band combination. That is, the UE may report its capability elaborately by reporting (1, 2) and (2, 1), not (2, 2), as (first Kmax, second Kmax).

Another shortcoming with Method 1 is that the computation power of the UE is not freely distributed between the two eMIMO types. For example, although the UE reports a K value for the first eMIMO type, that is, a first K value as 2, and a second K value as 2 in Method 1, it is assumed that only one CSI-RS is actually defined for the first eMIMO type. In this case, since the first K value is 2, the UE has an extra processing power, but cannot use the processing power for the second eMIMO type.

On the other hand, as the UE reports both (2, 2) and (1, 3) in Method 2, various implementations may be achieved between the first eMIMO type and the second eMIMO type by using the extra processing power of the UE.

Further, it may be indicated that hybrid CSI reporting is not supported for a specific case in Method 2. For example, the UE may report (1, 4) and (0, 8) in Method 2 to thereby indicate that hybrid CSI reporting is available for a second K value of 4 or less, but only the legacy scheme is supported without supporting hybrid CSI reporting, for a second K value of 8 or larger.

In an example of Method 2, the UE reports one second Kmax value for the second eMIMO type, and a first Kmax value of the first eMIMO type for every value ranging from 1 to the second Kmax value. (Or the UE reports one first Kmax value, and reports a second Kmax value for every value ranging from 1 to the first Kmax value.) For example, the UE reports a second Kmax value of 4, and first Kmax values corresponding to second K values of 1 to 4, that is, (first Kmax=1, 4), (first Kmax=1, 3), (first Kmax=2, 2), and (first Kmax=2, 1).

Further, the UE reports an Nmax value for every value ranging from 1 (or 0 in consideration of the legacy scheme) to a first Kmax value. For example, if Method 5 is adopted, the UE reports first Nmax+second Nmax for each of (first K, second K) values, that is, (1,4), (1,3), (2,2), (1,2), (2,1), and (1,1).

Method 3.

It may be considered that the UE supports a hybrid CSI reporting scheme in which 32 CSI-RSs are defined for the first eMIMO type, and 16 CSI-RSs are defined for the second eMIMO type, and a hybrid CSI reporting scheme in which 16 CSI-RSs are defined for the first eMIMO type, and 32 CSI-RSs are defined for the second eMIMO type. In this case, a first N value of 32 and a second N value of 32 should be reported in Method 1. However, if the UE supports the above hybrid CSI reporting schemes without supporting a hybrid CSI reporting scheme in which 32 CSI-RS ports are defined for the first eMIMO type, and 32 CSI-RS ports are defined for the second eMIMO type, there is a problem with reporting.

In this context, it is proposed in Method 3 that the UE reports its capability for a (first N, second N) pair, and reports a plurality of such pairs per UE per band per band combination. That is, the UE may report its capability elaborately by reporting (32, 16) and (16, 32), not (32, 32) in the above example.

As described before, a shortcoming with Method 1 is that the computation power of the UE is not freely distributed between the two eMIMO types. For example, although the UE reports an N value for the first eMIMO type, that is, a first N value as 32, and an N value for the second eMIMO type, that is, a second N value as 16 in Method 1, it is assumed that 16 CSI-RS ports are actually defined for the first eMIMO type. In this case, since the first N value is 32, the UE has an extra processing power, but cannot use the processing power for the second eMIMO type. That is, it is impossible to use hybrid CSI reporting by defining 16(second N)+16(first N–the number of CSI-RS ports configured actually for the first eMIMO type) CSI-RS ports for the second eMIMO type, using the extra processing power from the first eMIMO type.

On the other hand, as the UE reports both (32, 16) and (16, 32) in Method 3, various implementations may be achieved between the first eMIMO type and the second eMIMO type by using the extra processing power of the UE.

Further, it may be indicated that hybrid CSI reporting is not supported for a specific case in Method 3. For example, the UE may report (32, 64) and (0, 128) to thereby indicate that hybrid CSI reporting is available for a second N value of 64 or less, but only the legacy scheme is supported without supporting hybrid CSI reporting, for a second N value of 128 or larger.

In an example of Method 3, for an assumed specific K value, the UE reports one supported second Nmax value, and a first Nmax value of the first eMIMO type for every value ranging from 1 to the second Nmax value. (Or the UE reports one first Nmax value, and reports a second Nmax value for every value ranging from 1 to the first Nmax value.) Obviously, since a second Nmax value is reported for each assumed K value, a plurality of Nmax values are reported for a plurality of K values. For example, the UE reports a second Nmax value of 4, and first Nmax values corresponding to second N values of 1 to 4, that is, (first Nmax=1, 4), (first Nmax=1, 3), (first Nmax=2, 2), and (first Nmax=2, 1).

Method 4.

The UE reports one Kmax value per CSI process, as is done conventionally. One thing to note herein is that the UE reports the sum of a first Kmax value and a second Kmax value. Method 4 is characterized by great freedom with which the computation power of a UE is distributed between the two eMIMO types. For example, if the UE reports that Kmax=8, the UE may define one CSI-RS for the first eMIMO type, and 7 CSI-RSs for the second eMIMO type (or vice versa), or p CSI-RSs for the first eMIMO type, and Kmax-p CSI-RSs for the second eMIMO type. Additionally, the UE also reports one Nmax value, which is the sum of a first Nmax value and a second Nmax value.

However, if CSI calculation/channel estimation for the second eMIMO type requires greater computation power than for the first eMIMO type (having the same number of CSI-RS resources and the same number of CSI-RS ports), this reporting scheme is not viable.

Method 5.

According to a legacy capability reporting scheme, with mutual dependency between N and K, N and K are not reported independently. That is, a selectable N value is different according to a K value. As K increases, a selectable N value also increases. This is because the UE's computation power increases with a larger K value, and thus the UE can support a larger N value. Accordingly, a UE capability reporting scheme may be determined by combining Method 2 and Method 3, Method 2 and Method 4, Method 3 and Method 4, or the like. Also in this case, as K increases, a different selectable N value may be set.

Figure 12:
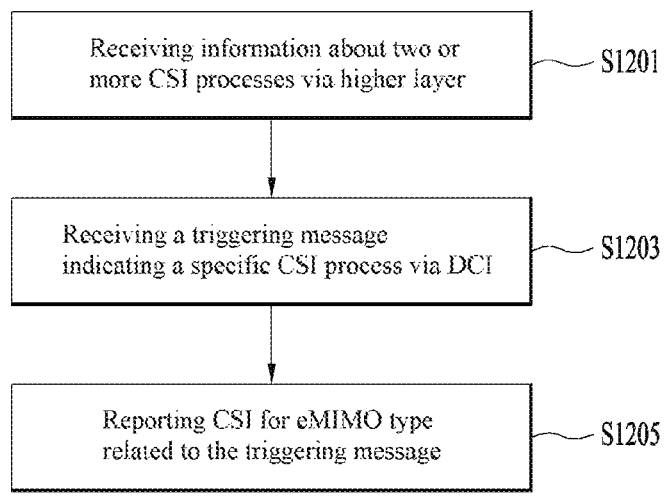
FIG. 12 is an exemplary view illustrating aperiodic hybrid CSI reporting according to an embodiment of the present invention.

FIG. 12 illustrates exemplary hybrid CSI reporting according to an embodiment of the present invention.

Referring to FIG. 12, a UE receives information about a plurality of CSI processes from an eNB through a higher layer in step 1201. Particularly, a hybrid CSI reporting scheme is defined for a specific CSI process among the plurality of CSI processes. The hybrid CSI reporting scheme includes reporting first eMIMO-type CSI and reporting second eMIMO-type CSI.

Subsequently, the UE receives a triggering message requesting CSI for the specific CSI process among the plurality of CSI processes by DCI in step 1203. Preferably, the triggering message may further include information about one of the first eMIMO type and the second eMIMO type.

Upon receipt of the triggering message, the UE receives an RS corresponding to the eMIMO type indicated by the DCI, calculates CSI based on the received RS, and reports the calculated CSI to the eNB in step 1205.

Figure 13:
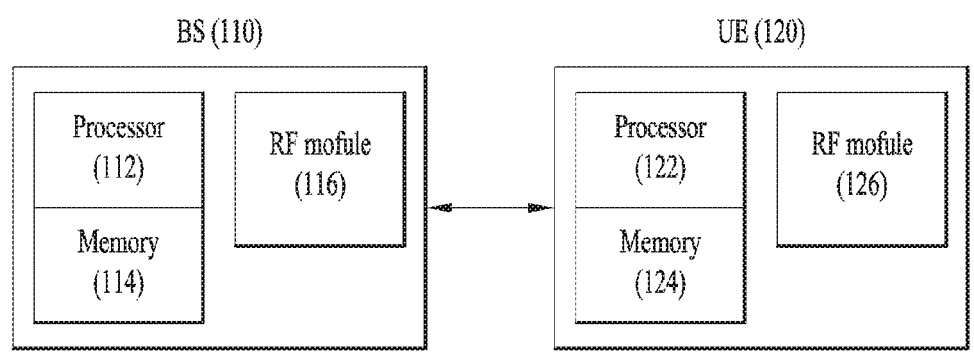
FIG. 13 is a block diagram of a base station (BS) and a UE, which are applicable to an embodiment of the present invention.

FIG. 13 is a block diagram of a BS and a UE which are applicable to an embodiment of the present invention.

Referring to FIG. 13, a wireless communication system includes a BS 110 and a UE 120. The BS 110 includes a processor 112, a memory 114, and a radio frequency (RF) unit 116. The processor 112 may be configured to implement the procedures and/or methods proposed in the present invention. The memory 114 is connected to the processor 112, and stores various types of information related to operations of the processor 112. The RF unit 116 is connected to the processor 112, and transmits and/or receives wireless signals. The UE includes a processor 122, a memory 124, and an RF unit 126. The processor 122 may be configured to implement the procedures and/or methods proposed in the present invention. The memory 124 is connected to the processor 122, and stores various types of information related to operations of the processor 122. The RF unit 126 is connected to the processor 122, and transmits and/or receives wireless signals. The BS 110 and/or the UE 120 may have a single antenna or multiple antennas.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

The memory unit resides inside or outside the processor, and may exchange data with the processor by various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the method and apparatus for reporting aperiodic hybrid CSI in a multi-antenna communication system have been described above in the context of a 3GPP LTE system, by way of example, the method and apparatus are also applicable to various wireless communication systems other than the 3GPP LTE system.

What is claimed is:

1. A method of reporting aperiodic channel status information (CSI) to a base station by a terminal in a wireless communication system, the method comprising:

receiving, from the base station, a CSI report triggering message for at least one of a plurality of CSI processes by downlink control information (DCI), the at least one CSI process being associated with one of a first enhanced multiple input multiple output (eMIMO) type or a second eMIMO type;

updating the aperiodic CSI for the at least one CSI process based on a reference signal corresponding to the one eMIMO type;

reporting the aperiodic CSI to the base station; and reporting, to the base station, first information about a maximum number of reference signal resources per CSI process, supported by the terminal, and second information about a sum of numbers of antenna ports in the reference signal resources per CSI process, supported by the terminal, wherein first information about the at least one CSI process is a sum of a maximum number of reference signal resources corresponding to the first eMIMO type and a maximum number of reference signal resources corresponding to the second eMIMO type, and wherein second information about the at least one CSI process is a sum of a number of antenna ports corresponding to the first eMIMO type and a number of antenna ports corresponding to the second eMIMO type.

2. The method according to claim 1, further comprising receiving, through a higher layer, information about the plurality of CSI processes for which a hybrid CSI reporting scheme is defined, wherein the hybrid CSI reporting scheme includes reporting CSI of the first eMIMO type and reporting CSI of the second eMIMO type.

3. The method according to claim 1, wherein the DCI includes an uplink grant.

4. The method according to claim 1, wherein a reference signal corresponding to the second eMIMO type is beamformed based on CSI reported based on a reference signal corresponding to the first eMIMO type.

5. A terminal in a wireless communication system, the terminal comprising:

a wireless communication module; and a processor connected to the wireless communication module, wherein the processor is configured to:

receive, from a base station, a channel status information (CSI) report triggering message for at least one of a plurality of CSI processes by downlink control information (DCI), the at least one CSI process being associated with one of a first enhanced multiple input multiple output (eMIMO) type or a second eMIMO type;

update aperiodic CSI for the at least one CSI process based on a reference signal corresponding to the one eMIMO type;

report the aperiodic CSI to the base station; and report, to the base station, first information about a maximum number of reference signal resources per CSI process, supported by the terminal, and second information about a sum of numbers of antenna ports in the reference signal resources per CSI process, supported by the terminal, wherein first information about the at least one CSI process is a sum of a maximum number of reference signal resources corresponding to the first eMIMO type and a maximum number of reference signal resources corresponding to the second eMIMO type, and wherein second information about the at least one CSI process is a sum of a number of antenna ports corresponding to the first eMIMO type and a number of antenna ports corresponding to the second eMIMO type.

6. The terminal according to claim 5, wherein the processor is further configured to receive, through a higher layer, information about the plurality of CSI processes for which a hybrid CSI reporting scheme is defined, and wherein the hybrid CSI reporting scheme includes reporting CSI of the first eMIMO type and reporting CSI of the second eMIMO type.

7. The terminal according to claim 5, wherein the DCI includes an uplink grant.

8. The terminal according to claim 5, wherein a reference signal corresponding to the second eMIMO type is beamformed based on CSI reported based on a reference signal corresponding to the first eMIMO type.

* * * * *